(12) United States Patent
Naruse et al.

(10) Patent No.: US 10,718,087 B2
(45) Date of Patent: Jul. 21, 2020

(54) PRETREATMENT AGENT, PRETREATMENT AGENT APPLICATOR, AND METHOD FOR FORMING IMAGE

(71) Applicant: BROTHER KOGYO KABUSHIKI KAISHA, Nagoya-shi, Aichi (JP)

(72) Inventors: Atsushi Naruse, Nagoya (JP); Goro Okada, Nagoya (JP); Yugo Fukui, Nagoya (JP)

(73) Assignee: BROTHER KOGYO KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 16/368,020

(22) Filed: Mar. 28, 2019

(65) Prior Publication Data

US 2019/0301086 A1 Oct. 3, 2019

(30) Foreign Application Priority Data

Mar. 30, 2018 (JP) .................................. 2018-070156
Mar. 18, 2019 (JP) .................................. 2019-049544

(51) Int. Cl.
| | |
|---|---|
| *D06P 1/00* | (2006.01) |
| *D06P 1/44* | (2006.01) |
| *D06P 1/52* | (2006.01) |
| *D06P 1/54* | (2006.01) |
| *C09D 11/54* | (2014.01) |
| *B41J 11/00* | (2006.01) |
| *C09D 11/10* | (2014.01) |
| *C09D 11/30* | (2014.01) |
| *B41J 3/407* | (2006.01) |

(Continued)

(52) U.S. Cl.
CPC ............ *D06P 1/445* (2013.01); *B41J 3/4078* (2013.01); *B41J 11/0015* (2013.01); *C09D 11/10* (2013.01); *C09D 11/30* (2013.01); *C09D 11/54* (2013.01); *D06P 1/5242* (2013.01); *D06P 1/54* (2013.01); *B41M 5/0017* (2013.01); *C09D 11/322* (2013.01); *D06P 5/30* (2013.01)

(58) Field of Classification Search
CPC ... D06P 1/445; D06P 5/30; D06P 1/54; C09D 11/54; C09D 11/30; B41J 3/4078; B41J 2/01; B41J 11/0015
See application file for complete search history.

(56) References Cited

U.S. PATENT DOCUMENTS

| | | |
|---|---|---|
| 2017/0058453 A1 | 3/2017 | Pan et al. |
| 2017/0283637 A1 | 10/2017 | Sakai |

FOREIGN PATENT DOCUMENTS

| | | |
|---|---|---|
| JP | 2004-291461 A | 10/2004 |
| JP | 2009-209493 A | 9/2009 |

(Continued)

OTHER PUBLICATIONS

English transaltion of the Japanese reference JP 2011189527 A dated (Sep. 2011).*

(Continued)

*Primary Examiner* — Eisa B Elhilo
(74) *Attorney, Agent, or Firm* — K&L Gates LLP

(57) ABSTRACT

The pretreatment agent is a pretreatment agent to be applied to fabric before application of an ink in formation of an image on the fabric and contains a water-based polymer virtually containing no carboxyl group and a crosslinking agent that is crosslinkable with a carboxyl group in a component contained in the ink.

9 Claims, 4 Drawing Sheets

(51) Int. Cl.
    *C09D 11/322*    (2014.01)
    *D06P 5/30*      (2006.01)
    *B41M 5/00*      (2006.01)

(56) References Cited

FOREIGN PATENT DOCUMENTS

| | | | | |
|---|---|---|---|---|
| JP | 2011 189527 A * | 9/2011 | ........... | C09D 11/324 |
| JP | 2011-189527 A | 9/2011 | | |
| JP | 2017-019916 A | 1/2017 | | |
| JP | 2017-517640 A | 6/2017 | | |
| KR | 2003-0058877 A | 7/2003 | | |
| WO | WO 2017/191660 A1 * | 9/2017 | ........... | C09D 139/06 |
| WO | 2017/191660 A1 | 11/2017 | | |
| WO | 2018/043414 A1 | 3/2018 | | |

OTHER PUBLICATIONS

Extended European Search Report issued in connection with corresponding European Patent Application No. 19165008.4, dated Jul. 3, 2019. ( pages).

\* cited by examiner

PRETREATMENT AGENT, PRETREATMENT AGENT APPLICATOR, AND METHOD FOR FORMING IMAGE

CROSS-REFERENCE TO RELATED APPLICATION

This application claims priority from Japanese Patent Applications No. 2018-070156 filed on Mar. 30, 2018 and No. 2019-049544 filed on Mar. 18, 2019. The entire subject matter of the Japanese Patent Applications is incorporated herein by reference.

BACKGROUND

A method for forming an image by ejecting an ink on fabric such as clothes using an ink-jet method is widely known. The method for forming an image includes, for example, a pretreatment step of applying a pretreatment agent to fabric, and a heat-fixing step of thermally fixing the ink on the fabric after ejecting the ink on a pretreatment agent-applied area.

SUMMARY

The pretreatment agent is a pretreatment agent to be applied to fabric before application of an ink in formation of an ink on the fabric, comprising: a water-based polymer virtually containing no carboxyl group; and a crosslinking agent that is crosslinkable with a carboxyl group in a component contained in the ink.

DETAILED DESCRIPTION

Figure 1A:
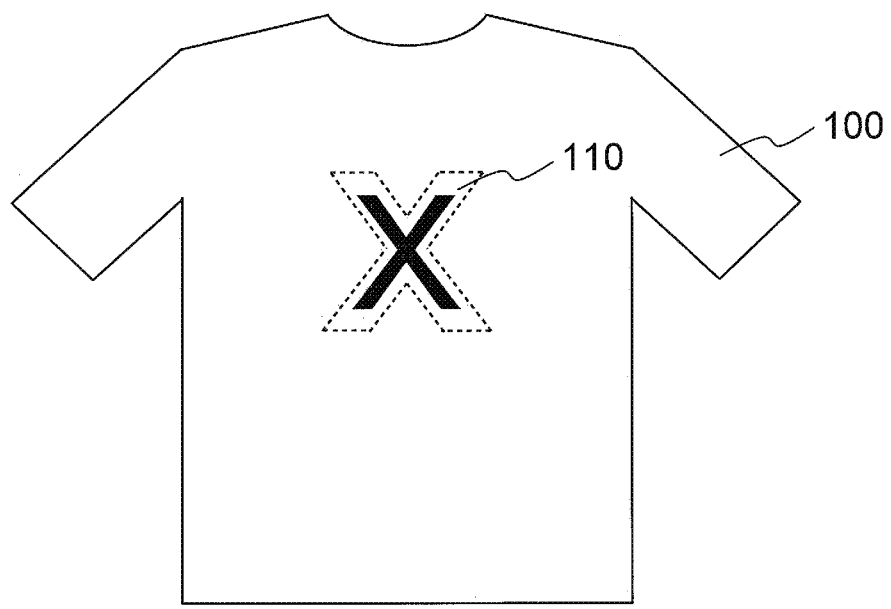
FIGS. 1A and 1B are illustrations showing example applications of a pretreatment agent in a method for forming an image.

The "water-based polymer" contains a water-soluble polymer and is, for example, a polymer that is dispersible or soluble in water.

The pretreatment agent is a pretreatment agent to be applied to fabric before application of an ink in formation of an image on the fabric and contains a water-based polymer virtually containing no carboxyl group and a crosslinking agent that is crosslinkable with a carboxyl group in a component contained in the ink. The pretreatment agent is characterized in that it contains the water-based polymer and the crosslinking agent, and other configurations are by no means limited. The pretreatment agent may contain a coloring agent such as a pigment or a dye, for example, however preferably does not contain a coloring agent. The pretreatment agent is not an ink, for example, and preferably does not contain a coloring agent. When the pretreatment agent contains a coloring agent, the amount of the coloring agent is an amount with which the pretreatment agent does not virtually serve as an ink for printing on fabric.

The fabric includes a knit fabric and a woven fabric. The material of the fabric may be a natural fiber or a synthetic fiber. Examples of the natural fiber include cotton and silk. Examples of the synthetic fiber include polyester, acryl, rayon, urethane, and nylon. The material of the fabric may be blended fabric obtained by mixing and spinning a plurality of kinds of fibers such as cotton/polyester=50%/50%.

The water-based polymer does not virtually contain a carboxyl group. Examples of the water-based polymer include polyvinylpyrrolidone (water-soluble polymer), polyvinyl alcohol (water-soluble polymer), polyacryl amide (water-soluble polymer), hydroxyethyl cellulose (water-soluble polymer), starch (water-soluble polymer), and dextrin (water-soluble polymer). Examples of the water-based polymer include resins (water-based disperse polymers) obtained by emulsifying compounds composed of monomers such as styrene, acrylamide, ethylene, and vinyl acetate.

As the water-based polymer, for example, a commercially available product may be used. Examples of the commercially available product include "PITZCOL® K-60L" (manufactured by DKS Co., Ltd.) which is polyvinylpyrrolidone, "VINYBLAN® GV-6181" (manufactured by Nissin Chemical Industry Co., Ltd.) which is a vinyl acetate emulsion resin, and "KURARAY POVAL® PVA217" (manufactured by KURARAY CO., LTD.) which is polyvinyl alcohol.

The pretreatment agent contains a water-based polymer as a resin component, whereby traces of the applied pretreatment agent can be easily removed by washing. In the pretreatment agent, the water-based polymer does not virtually contain a carboxyl group. Thus, the water-based polymer does not crosslink with a crosslinking agent to be described below, or if the water-based polymer crosslinks with the crosslinking agent, the extent is slight. The pretreatment agent contains the crosslinking agent that is crosslinkable with a carboxyl group in the component contained in the ink, whereby peel-off of the ink in washing is prevented, washing fastness becomes good, and in addition, generation of deposit caused by the crosslinking agent when the pretreatment agent is stored for a long period of time can be prevented or inhibited, storage stability becomes good, and the pretreatment agent is easily applied to fabric uniformly.

The content of the water-based polymer in the total amount of the pretreatment agent is, for example, 0.1 wt % to 0.5 wt % in actual use. In this case, for example, the range of the content of the water-based polymer may be caused to be in the range by preparing the pretreatment agent with a high concentration of the water-based polymer and diluting it (e.g., 3-fold dilution with water) in actual use, or the pretreatment agent may be prepared so that the content of the water-based polymer can be in the range.

The crosslinking agent is crosslinkable with a carboxyl group in a component contained in an ink to be described below. Examples of the crosslinking agent include an oxazoline group-containing compound, a carbodiimide group-containing compound, an isocyanate group-containing compound, an aziridine group-containing compound, an epoxy group-containing compound, and a water-based crosslinking agent obtained by applying a hydrophilic segment to a polycarbodiimide resin.

As the crosslinking agent, for example, a commercially available product may be used. Examples of the commercially available product include: "EPOCROS® WS-700" (manufactured by Nippon Shokubai Co., Ltd.) which is an oxazoline group-containing water-soluble polymer; and "CARBODILITE® V-02" (manufactured by Nisshinbo Chemical Inc.) which is a water-based crosslinking agent obtained by applying a hydrophilic segment to a polycarbodiimide resin.

The crosslinking agent contained in the pretreatment agent is crosslinkable with a carboxyl group in a component contained in an ink to be ejected on a pretreatment agent application portion, and the pretreatment agent thus has good washing fastness to an image forming portion.

The content of the crosslinking agent is, for example, 1 part by weight or more relative to 100 parts by weight of the water-based polymer. When the content of the crosslinking agent is 1 part by weight or more, the washing fastness becomes further excellent. The content of the crosslinking agent is, for example, 100 parts by weight or less relative to 100 parts by weight of the water-based polymer. When the content of the crosslinking agent is 100 parts by weight or less, traces of the applied pretreatment agent can be easily removed, and storage stability becomes better.

The pretreatment agent may further contain water. The water can be, for example, distilled water, ion-exchange water, or pure water. The content of the water in the total amount of the pretreatment agent may be, for example, the balance of other components.

The pretreatment agent may further contain additives such as a metal salt, a water-soluble organic solvent, a pH adjuster, a viscosity modifier, a surface tension modifier, preservative, and a mildewproofing agent as necessary. The metal salt is not particularly limited, and examples thereof include calcium chloride, calcium bromide, calcium iodide, calcium nitrite, calcium nitrate, calcium dihydrogenphosphate, calcium thiocyanate, calcium lactate, calcium fumarate, calcium citrate, magnesium chloride, magnesium bromide, magnesium iodide, magnesium sulfate, aluminium chloride, aluminium bromide, aluminium sulfate, aluminium nitrate, aluminium acetate, barium chloride, barium bromide, barium iodide, barium nitrate, barium thiocyanate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc thiocyanate, and zinc acetate, and hydrates thereof, and the like. Examples of the water-soluble organic solvent include polyalcohol, polyalcohol derivatives, alcohol, amide, ketone, ketoalcohol, ether, nitrogen-containing solvents, sulfur-containing solvents, propylene carbonate, ethylene carbonate, and 1,3-dimethyl-2-imidazolidinone. Examples of the polyalcohol include glycerin, ethylene glycol, diethylene glycol, propylene glycol, butylene glycol, hexylene glycol, triethylene glycol, polyethylene glycol, dipropylene glycol, tripropylene glycol, polypropylene glycol, trimethylolpropane, 1,5-pentanediol, and 1,2,6-hexanetriol. Examples of the polyalcohol derivative include ethylene glycol methyl ether, ethylene glycol ethyl ether, ethylene glycol-n-propyl ether, ethylene glycol-n-butyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. Examples of the alcohol include methyl alcohol, ethyl alcohol, n-propyl alcohol, isopropyl alcohol, n-butyl alcohol, sec-butyl alcohol, isobutyl alcohol, tert-butyl alcohol, and benzyl alcohol. Examples of the amide include dimethylformamide and dimethylacetamide. The ketone can be, for example, acetone or the like. The ketoalcohol can be, for example, diacetone alcohol or the like. Examples of the ether include tetrahydrofuran and dioxane. Examples of the nitrogen-containing solvent include pyrrolidone, 2-pyrrolidone, N-methyl-2-pyrrolidone, cyclohexylpyrrolidone, and triethanolamine. Examples of the sulfur-containing solvent include thiodiethanol, thiodiglycol, thiodiglycerol, sulfolane, and dimethylsulfoxide.

The pretreatment agent may be prepared by uniformly mixing the water-based polymer and the crosslinking agent and an additive component(s) as necessary by a conventionally known method, for example. The pretreatment agent may be prepared by removing an insoluble matter(s) with a filter or the like after mixing, for example.

A set of an ink and the pretreatment agent is a set of an ink to be used in formation of an image on fabric and the pretreatment agent, and the ink contains a coloring agent and a component having a carboxyl group. As mentioned above, the ink is characterized in that it contains a coloring agent and a component having a carboxyl group, and other configurations is by no means limited. For example, the ink may contain water or may contain a component other than a coloring agent, a component containing the carboxy group, and water. As the ink, for example, a pigment ink, a dye ink, or the like may be used, and the pigment ink is preferable. The ink may include inks of five colors, namely white, yellow, magenta, cyan, and black, for example.

The white ink may contain a white pigment containing a hollow particle or a non-hollow particle (which is a particle which is not hollow and is also called a solid particle) as a coloring agent, for example. In the white ink, the hollow particle and the non-hollow particle are used in combination as the white pigment, for example.

Examples of the hollow particle include "SX-866(B)" (styrene-acrylic dispersion liquid, pigment solid content: 20 wt %, primary particle size: 0.3 μm) and "SX-868(B)" (styrene-acrylic dispersion liquid, pigment solid content: 20 wt %, primary particle size: 0.5 μm), produced by JSR CORPORATION; "ROPAQUE® ULTRA E" (styrene-acrylic dispersion liquid, pigment solid content: 30 wt %, primary particle size: 0.4 μm) produced by Rohm and Haas Electronic Materials K.K.; and "NIPOL® V1004" (modified styrene-butadiene dispersion liquid, pigment solid content: 50 wt %, primary particle size: 0.3 μm), "NIPOL® MH8055" (styrene-acrylic dispersion liquid, pigment solid content: 30 wt %, primary particle size: 0.8 μm), and "NIPOL® MH5055" (styrene-acrylic dispersion liquid, pigment solid content: 30 wt %, primary particle size: 0.5 μm), produced by ZEON CORPORATION. It is to be noted that the primary particle size indicates a volume average particle size.

Examples of the non-hollow particle include white pigments having high shielding property such as titanium oxide, silicon oxide, zinc oxide, aluminum oxide, magnesium oxide, barium sulfate, and calcium carbonate.

The white ink may further contain a polymer dispersant obtained by neutralizing an anionic water-soluble resin with a basic compound, for example. The anionic water-soluble resin can be, for example, a copolymer obtained by causing the mixture of one or two or more of carboxyl group-containing unsaturated monomers (including acid anhydride group-containing unsaturated monomer that imparts a carboxyl group by opening a cyclic compound) and one or two or more of unsaturated monomers to react with each other. Examples of the carboxyl group-containing unsaturated monomer include acrylic acid, methacrylic acid, itaconic acid, maleic acid, maleic anhydride, maleic monoalkylester, citraconic acid, citraconic anhydride, and citraconic monoalkylester. Examples of the unsaturated monomer include styrene monomers such as styrene, α-methyl styrene, and vinyl toluene; aralkyl methacrylate or acrylate such as benzyl methacrylate and benzyl acrylate; and alkyl methacrylate or acrylate such as methyl methacrylate, butyl methacrylate, 2-ethyl hexyl methacrylate, stearyl methacrylate, lauryl methacrylate, methyl acrylate, butyl acrylate, 2-ethyl hexyl acrylate, stearyl acrylate, and lauryl acrylate. Preferably, the anionic water-soluble resin is a copolymer obtained by causing the mixture of the monomers selected to react so as to have a glass-transition temperature of 0° C. to 80° C. Examples of the basic compound include alkali metal hydroxide such as sodium hydroxide and potassium hydroxide; and organic basic compounds such as triethylamine, monoethanolamine, triethanolamine, and triethylenediamine.

The amount of the polymer dispersant to be used relative to 100 parts by weight of the white pigment is, for example, 10 parts by weight to 40 parts by weight or 15 parts by weight to 30 parts by weight.

The white ink further contains, for example, a component containing a carboxyl group. Examples of the component containing a carboxyl group include resin components such as a urethane-based resin emulsion, an acrylic resin emulsion, and a styrene-based resin emulsion. The resin component is required to contain a carboxyl group and may be any resin component, and the acid value of the resin is 1 mgKOH/g to 300 mgKOH/g. The form of the resin component containing a carboxyl group is not limited, and the resin component may be contained in a single resin or contained as a resin emulsion, for example.

The total solid content of the white pigment, the polymer dispersant, the resin component, the nonionic resin emulsion, and the anionic resin emulsion relative to the total amount of the white ink is, for example, 25 wt % to 45 wt %.

Besides them, the white ink may contain a moisturizer, a surfactant, a pH adjuster, a viscosity modifier, a surface tension modifier, a preservative, and a mildewproofing agent, for example. The moisturizer prevents the white ink from drying, for example. Examples of the moisturizer include ketoalcohol such as diacetone alcohol; polyalcohol such as polyalkylene glycol, alkylene glycol, glycerin, and trimethylolpropane; 2-pyrrolidone; N-methyl-2-pyrrolidone; and 1,3-dimethyl-2-imidazolidinone. Examples of the polyalkylene glycol include polyethylene glycol and polypropylene glycol. Examples of the alkylene glycol include ethylene glycol, propylene glycol, diethylene glycol, triethylene glycol, dipropylene glycol, tripropylene glycol, thiodiglycol, and hexylene glycol. These moisturizers may be used alone or in a combination of two or more of them. Among them, the white ink preferably contains alkylene glycol and polyalcohol such as glycerin. The content of the moisturizer in the total amount of the ink is, for example, 0 wt % to 60 wt %, 3 wt % to 50 wt %. The surfactant adjusts the surface tension of the white ink and improves the dispersibility of the white pigment, for example. The surfactants may be used alone or in a combination of two or more of them.

The pretreatment agent applicator is for applying a pretreatment agent to fabric before application of an ink in formation of an image on the fabric and includes a platen and a pretreatment agent application unit configured to apply the pretreatment agent to the fabric, and the pretreatment agent contains a water-based polymer virtually containing no carboxyl group and a crosslinking agent that is crosslinkable with a carboxyl group in a component contained in the ink.

The platen may have the same configuration as the platen in the ink-jet recording apparatus to be described below shown in FIG. 2, for example.

Examples of the pretreatment agent application unit include a liquid ejection unit such as a liquid ejection head, a sprayer, a stamp, a brush, and a roller.

The pretreatment agent in the pretreatment agent applicator is the same as the above-mentioned pretreatment agent and can be described with reference to the description of the above-mentioned pretreatment agent.

A method for forming an image on a fabric, comprising the steps of: applying the pretreatment agent to a fabric; and printing an image on a pretreatment agent-applied area using an ink.

Besides the two steps, the method for forming an image may further include a heat treatment step, a compression step, and a heat-fixing step to be described below, for example.

In the pretreatment step, the pretreatment agent may be applied, for example, by an ink-jet method, a spraying method, a stamping method, a brushing method, a method using a roller, or a method using a padding system.

Figure 1B:
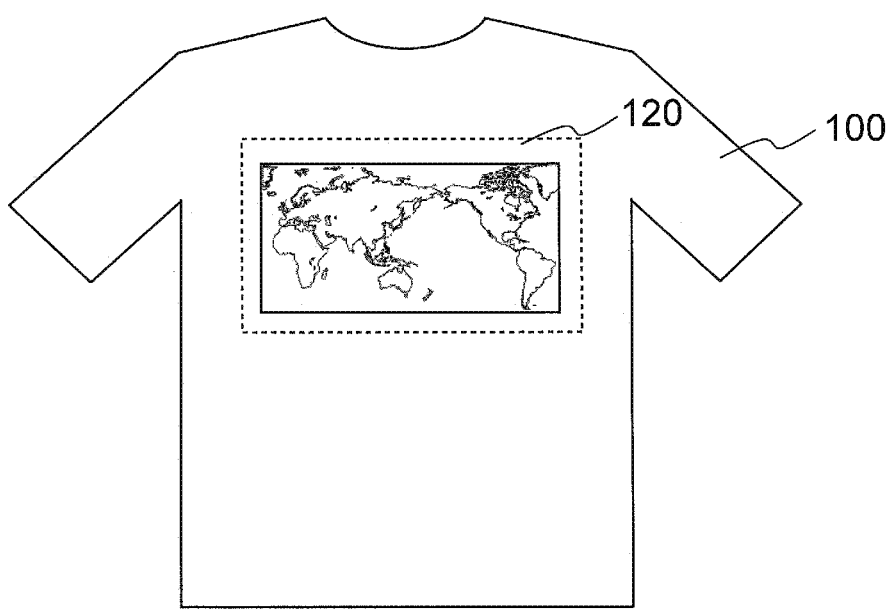

In the pretreatment step, the pretreatment agent may be applied to the entire image-forming surface or a part of the image-forming surface on the fabric. When the pretreatment agent is applied to a part of the image-forming surface, an area which is almost the same as an area to be printed with an ink in the image-forming surface on the fabric is at least a pretreatment agent-applied area. When the pretreatment agent is applied to a part of the image-forming surface, the size of the pretreatment agent-applied area is preferably larger than the area to be printed. For example, as shown in FIG. 1A, when the letter "X" is printed on fabric (T-shirt in this example) 100, the pretreatment agent is preferably applied to form a pretreatment agent-applied area 110 having a line width wider than that of the letter. Furthermore, as shown in FIG. 1B, when an image is printed on the fabric (T-shirt) 100, the pretreatment agent is preferably applied to form a pretreatment agent-applied area 120 that is larger than the image.

The method for forming an image may include, after the treatment step, at least one of a heat treatment step of applying a heat treatment to a pretreatment agent-applied area and a compression step of compressing the pretreatment agent-applied area. The heat treatment may be applied by using a commercially available hot pressing machine, oven, belt conveyor oven, or the like, for example. When the hot pressing machine is used, the heat treatment is preferably performed in the state where Teflon® sheet having a flat surface is placed on the pretreatment agent-applied area. Accordingly, fuzz on the fabric can be prevented, and for example, when the image printing step is performed after this step, the image printing step can be performed smoothly. The temperature of the heat treatment is not limited to particular temperatures, and is, for example, from 160° C. to 185° C. The compression may be performed by using a commercially available hot pressing machine under the same condition as the heat treatment, for example.

Next, the image printing step is a step of printing an image on a pretreatment agent-applied area using an ink.

The image printing step may include a base forming step of forming a base on the pretreatment agent-applied area with a first ink and an image forming step of forming an image on the base with a second ink. The first ink may be a white ink, and the second ink may be a color ink. In this manner, a color image having a high color developing property can be formed on the fabric having a dark background color.

Figure 2:
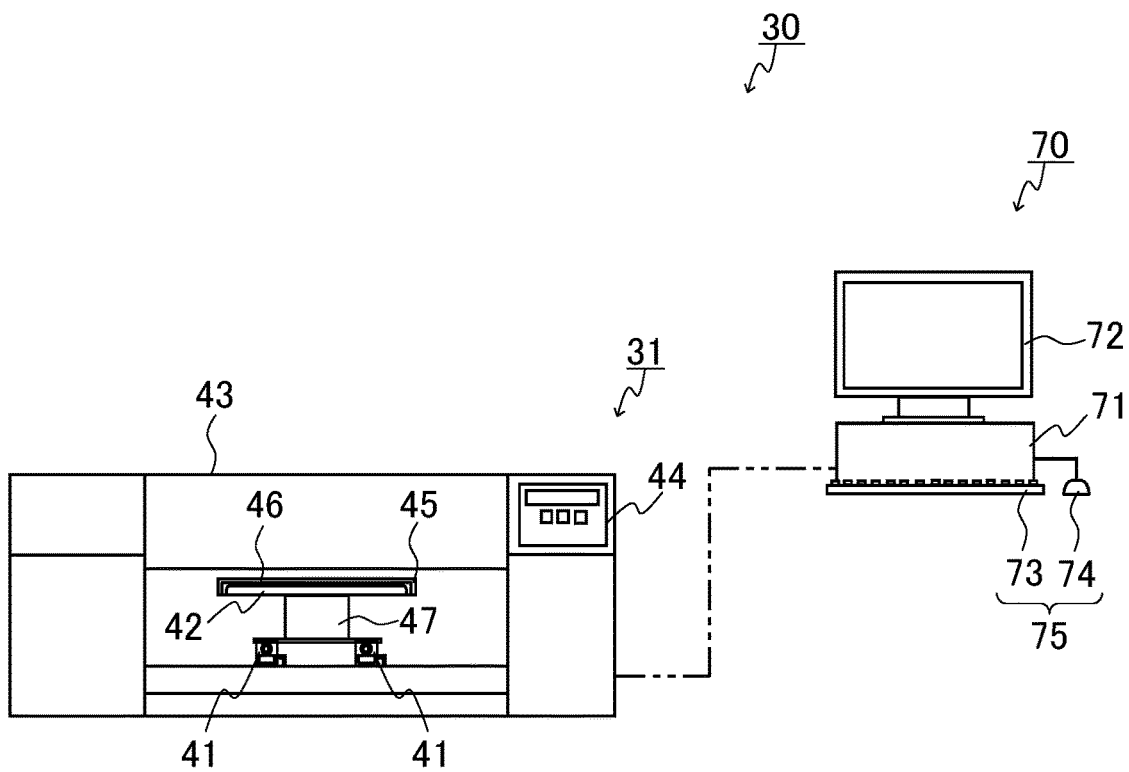
FIG. 2 is a schematic view showing an example configuration of an ink-jet recording apparatus.

The image printing step can be performed by using, for example, the ink-jet recording apparatus shown in FIG. 2. As shown in FIG. 2, the ink-jet recording apparatus 30 is configured such that an ink-jet printer 31 configured to record a desired image by ejecting an ink on fabric and a recording control unit 70 configured to acquire the image data of the desired image and control the ink-jet printer 31 are connected to each other via an interface.

Figure 3:
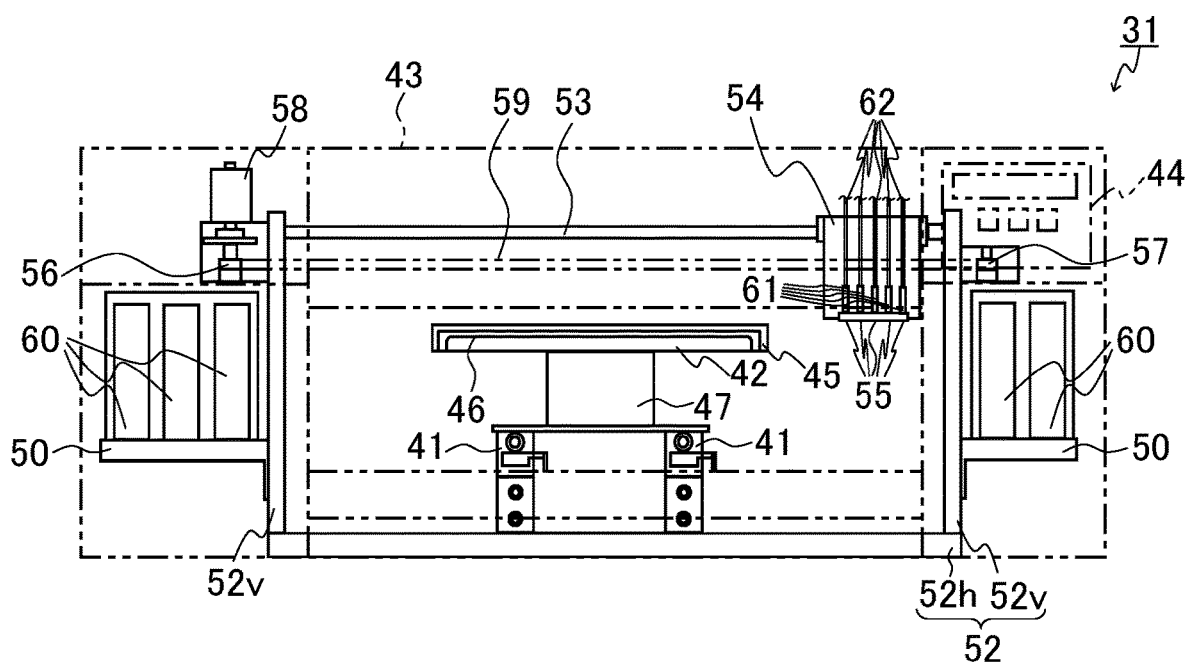
FIG. 3 is a front view showing an example configuration of an ink-jet printer of the ink-jet recording apparatus shown in FIG. 2.

The ink-jet printer 31 is provided with a frame 52 as shown in FIG. 3. The frame 52 includes a horizontal portion 52h located at the bottom of the printer 31 and two vertical portions 52v vertically rising from the both ends of the horizontal portion 52h. In FIG. 3, identical parts to those shown in FIG. 2 are indicated with identical numerals and symbols. The same applies to FIGS. 4A, 4B, and 5.

A slide rail 53 is horizontally extended so as to link the upper parts of the two vertical portions 52v. The slide rail 53 is provided with a carriage 54 which is slidable along the longitudinal direction (main scanning direction) of the slide rail 53. On the lower surface of the carriage 54, five piezoelectric ink-jet heads (ink ejecting units) 55 for ejecting five colors of inks, respectively, are provided.

Pulleys 56 and 57 are supported by the upper parts of the two vertical portions 52v. The motor shaft of a motor 58 is linked to one of the pulleys (pully 56), which is supported by the vertical portion 52v. An endless belt 59 is extended between the pulleys 56 and 57, and the carriage 54 is fixed on an appropriate part of the endless belt 59.

With such a configuration, in response to the forward and reverse rotations of one of the pulleys (pulley 56) driven by the motor 58, the carriage 54 is linearly reciprocated along the longitudinal direction (main scanning direction) of the slide rail 53. As a result, the ink-jet head 55 is reciprocated.

A mounting portion 50 to which ink cartridges 60 are detachably mounted is formed on each of the two vertical portions 52v. The ink cartridges 60 of two colors can be mounted on one of the two mounting portions 50 and the ink cartridges 60 of three colors can be mounted on the other of the two mounting portions 50. Ink bags (not shown) provided in the ink cartridges 60 are connected to five ink tanks 61 located above the ink-jet heads 55, respectively, through flexible tubes 62. Since the five ink tanks 61 are in communication with the ink-jet heads 55 as described below, the inks are supplied from the ink cartridges 60 to the ink-jet heads 55.

On the horizontal portion 52h of the frame 52, a slide mechanism 41 is provided as a carrying unit, and a platen (support) 42 is supported by the slide mechanism 41 from below. The platen 42 is provided with a fixing frame (fixing unit) 45 configured to position fabric such as a T-shirt with the surface including an area to be recorded up and set the T-shirt in the state where it is tautly stretched and has no wrinkles or unevenness. The ink-jet printer 31 of this example includes one platen 42. The number of the platens however is not limited to one in the present invention and can be increased as needed.

In order to reciprocate the platen 42 in the direction perpendicular to the paper surface in FIG. 3 (sliding direction of slide mechanism 41, subscanning direction of ink-jet printer 31), a platen feeding mechanism (not shown) is provided. As the platen feeding mechanism, for example, a rack-and-pinion mechanism, a mechanism using an endless belt, and the like can be applied.

Figure 4A:
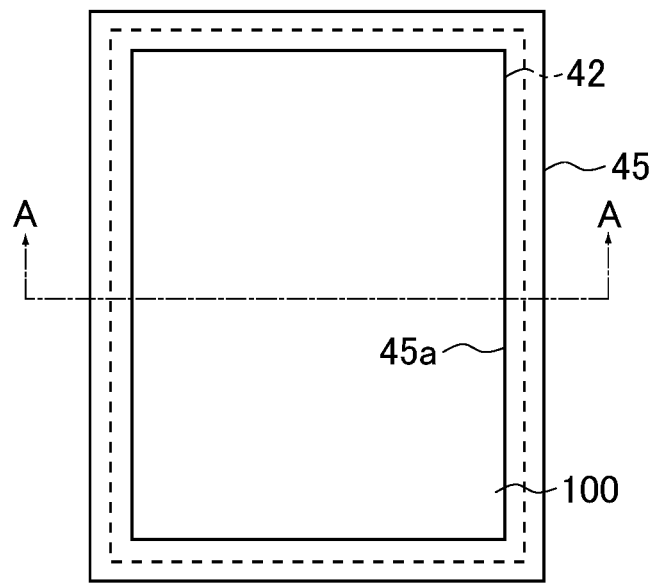
FIG. 4A is a plan view showing the state where fabric is set on a platen of the ink-jet recording apparatus shown in FIG. 2.
Figure 4B:
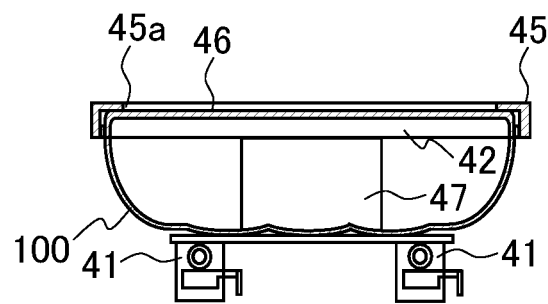
FIG. 4B is a cross-sectional view taken along line A-A of FIG. 4A.

As shown in FIGS. 4A and 4B, the platen 42 is a rectangle having the longitudinal direction in the subscanning direction in a planer view and includes a support surface 46 for supporting a T-shirt 100. The lower surface of the platen 42 at the farthest side in the direction perpendicular to the paper surface in FIG. 4B is linked to the slide mechanism 41 at the facing position through a support member 47.

The fixing frame 45 having an L-shaped cross section is configured to cover the four sides of the support surface 46 of the platen 42. An opening 45a having an opening area slightly smaller than the area of the support surface 46 of the platen 42 is formed on the surface of the fixing frame 45 facing the support surface 46 of the platen 42. In setting of the T-shirt 100 on the platen 42, the T-shirt 100 is placed on the platen 42 from the hem side in such a manner that the support surface 46 of the platen 42 is covered with the T-shirt 100 and the T-shirt 100 is fixed with the fixing frame 45. The fixing frame 45 is provided rotatably by a rotation portion (not shown) provided at the end of the platen 42, positioned at the farthest side in the direction perpendicular to the paper surface in FIG. 4B, and the T-shirt 100 is fixed between the platen 42 and the fixing frame 45 by rotating the fixing frame 45 so as to fit to the platen 42 after covering the platen 42 with the T-shirt 100.

The ink-jet printer 31 includes a cover 43. The ink-jet heads 55, the slide mechanism 41, and the like are covered with the cover 43. The cover 43 is perspectively illustrated by chain double-dashed lines in FIG. 3. An operation panel 44 provided with a liquid crystal panel and operation buttons is provided at the right upper part of the front surface of the cover 43.

The five ink-jet heads 55 shown in FIG. 3 correspond to the inks of five colors (white, yellow, magenta, cyan, and black), are arranged in parallel along the reciprocating direction of the carriage 54, and are in communication with the corresponding ink cartridges 60 through the flexible tubes 62 and the ink tanks 61. As the configuration for supplying inks to the ink-jet heads, for example, a conventionally known configuration may be adopted (for example, see JP 2004-291461 A). As to the five ink-jet heads 55, a head unit including ejection units configured to eject the inks of four colors (yellow, magenta, cyan, and black), respectively, and a head unit including an ejection unit configured to eject a white ink may be aligned in the subscanning direction. The ink-jet printer 31 may further include, besides the five ink-jet heads 55, a liquid ejection unit as a unit for applying the pretreatment agent to fabric in advance. The ink-jet printer 31 may further include a unit configured to apply the pretreatment agent to fabric in advance such as a sprayer, for example.

The ink-jet heads 55 are disposed in such a manner that a small gap is formed between the lower surfaces of the ink-jet heads 55 and the support surface 46 of the platen 42, and an area to be recorded of the T-shirt 100 set on the platen 42 is fed to the gap when an image is recorded on the T-shirt 100. With this configuration, by reciprocating the ink-jet heads 55 by the carriage 54 while ejecting the color inks from multiple ejection nozzles with micro-diameters formed on the bottom surfaces of the ink-jet heads 55 to the T-shirt 100, the color inks are held on the surface of fabric. As a result, a desired color image is recorded on the T-shirt 100.

The recording control unit 70 shown in FIG. 2 is, for example, configured by using a general-purpose personal computer (PC) and includes a main body 71, a display as a display section 72, and a keyboard 73 and a mouse (pointing device) 74 as an operation section 75.

Figure 5:
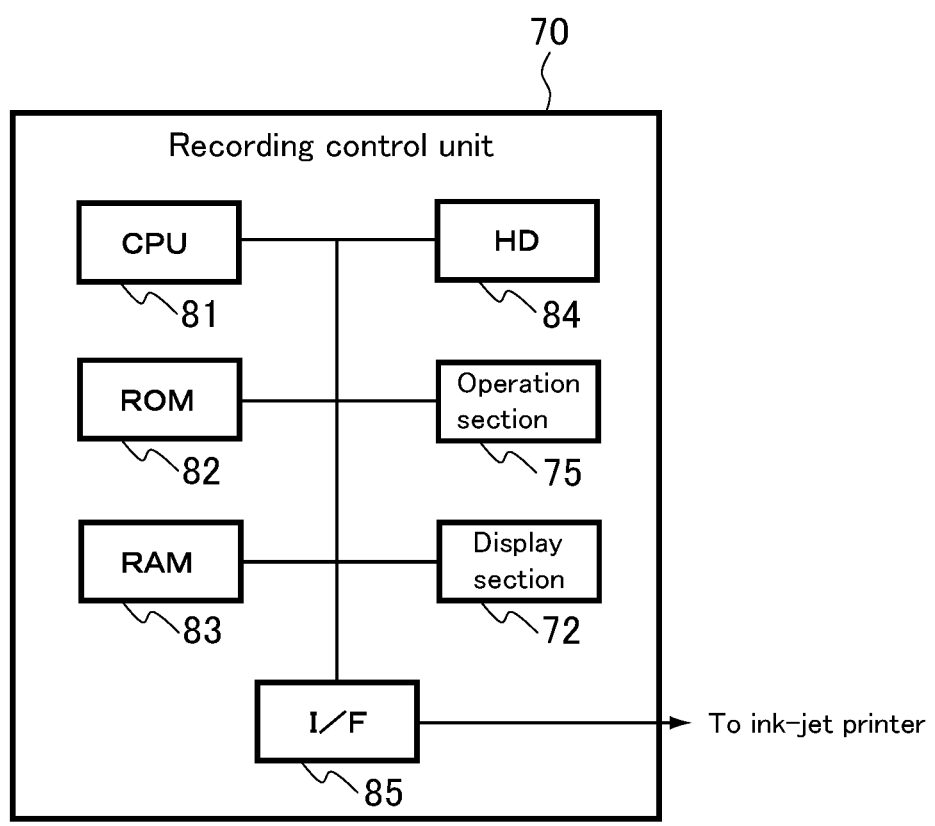
FIG. 5 is a block diagram showing a configuration of a recording control unit of the ink-jet recording apparatus shown in FIG. 2.

As shown in FIG. 5, the recording control unit 70 includes a central processing unit (CPU) 81, a read only memory (ROM) 82, a random access memory (RAM) 83, a hard disk (HD) 84, an operation section 75, a display section 72, and an interface (I/F) 85, and they are connected one another via a bus.

The HD 84 stores various programs for use in control of the operation of the recording control unit 70. The HD 84 further stores various pieces of image data downloaded via the internet or the like or created by software and various pieces of data of every kind of fabric such as a T-shirt. The CPU 81 performs various operations and processes based on signals input with the operation section 75 and various programs and data stored in the ROM 82, the RAM 83, and the HD 84. The CPU 81 sends data and the like to the ink-jet printer 31 via the interface 85. The RAM 83 is a volatile storage device which is readable and writable and stores results of the operations and the like obtained in the CPU 81. The interface 85 is connected to the interface of the ink-jet printer 31 and allows communication between the recording control apparatus 70 and the ink-jet printer 31.

The recording of a desired image on the T-shirt 100 by using the ink-jet recording apparatus 30 of the present example can be performed as follows, for example. First, the ink-jet recording apparatus 30 acquires the data of a desired image to be recorded on the T-shirt 100 via the keyboard 73 and the mouse 74 of the recording control unit 70. As to the acquisition of the image data, the image data is created by using software installed in the recording control unit 70 or the image data preliminarily stored in the HD 84 is selected.

Next, the T-shirt 100 is fixed to the platen 42. That is, the T-shirt 100 is placed on the platen 42 from the hem side, stretched along the support surface 46 of the platen 42, and fixed with the fixing frame 45 in the state of having no wrinkles.

In response to the instruction of recording by a user, the image data is sent to the ink-jet printer 31 via the interface 85, inks are ejected from the ink-jet heads 55 based on this image data, and an image is recorded on the T-shirt 100 fixed on the platen 42.

The method for forming an image may further includes, after the image printing step, a heat-fixing step of thermally fixing the ink on the fabric by applying a heat treatment to the printed area on the fabric. The heat-fixing step can be performed using the same machine under the same condition as the heat treatment, for example. The heat-fixing step can be performed using the machine described in JP 2009-209493 A, for example. With this machine, the fabric can be heated at 180° C. and compressed.

A method for producing fabric is a method for producing fabric having an image and includes the step of forming an image on fabric by the method for forming an image.

According to the method for forming an image and the method for producing fabric of the present invention, traces of applied pretreatment agent can be easily removed by washing, and fabric having good appearance and good washing fastness of the image-formed area thus can be obtained.

EXAMPLES

The examples are described below together with comparative examples. The present invention, however, is by no means limited thereto.

Example 1-1 and Comparative Examples 1-1 to 1-3

Components of the pretreatment agent composition (Table 1) were stirred and mixed, thereby obtaining pretreatment agents of Example 1-1 and Comparative Examples 1-1 to 1-3 shown in Table 1.

By using each of the pretreatment agents of Example 1-1 and Comparative Examples 1-1 to 1-3, an image was formed on a black T-shirt (material: cotton 100%) by the following steps.

(Pretreatment Step)

The pretreatment agent was diluted with water to have a weight of 3 times and then applied to an image-forming surface of the T-shirt using a spray. The amount of the pretreatment agent to be applied was 0.02 g/cm$^2$.

(Heat Treatment Step)

A pretreatment agent-applied area of the T-shirt after the pretreatment step was subjected to a heat treatment for 35 seconds using a heat press machine set at 180° C.

(Image Printing Step)

The character (A) was printed by ejecting an ink on a T-shirt by using a garment printer produced by Brother Industries, Ltd. As to the ink, as a white ink for forming a base in a pretreatment agent-applied area, an aqueous dispersion liquid (water-based white ink) containing 1 wt % to 25 wt % of a pigment, 1 wt % to 30 wt % of a resin having an carboxyl group, 0 wt % to 60 wt % of a moisturizer, and 0 wt % to 2 wt % of a surfactant was used, and as a color ink for forming a character (A) in the base, an aqueous dispersion liquid (water-based color ink) containing 1 wt % to 10 wt % of a pigment, 1 wt % to 25 wt % of a resin having a carboxyl group, 0 wt % to 60 wt % of a moisturizer, and 0 wt % to 2 wt % of a surfactant was used.

(Heat-Fixing Step)

After the image printing step, the white ink was thermally fixed on the T-shirt using an oven set at 160° C. The heating time in the heat fixing was 3.5 minutes.

The pretreatment agents of Example 1-1 and Comparative Examples 1-1 to 1-3 were subjected to (a) a storage stability evaluation, (b) an evaluation of ease of removing traces of applied pretreatment agent, and (c) an evaluation of washing fastness of image-formed area by the following methods.

(a) Storage Stability Evaluation

Each pretreatment agent (not diluted with water) was placed in a glass container, stored in an environment at 60° C. for 336 hours, and the change in viscosity and the change in appearance before and after the storage were evaluated according to the following evaluation criteria. The viscosities before and after the storage were measured at 25° C. using a rotational viscometer DV-II+ manufactured by BROOKFIELD, and the rate of change in viscosity was calculated by the following equation.

$$\Delta\eta = 100 \times (\mu a - \eta b)/\eta b$$

ηa: viscosity before storage (mPa·s)
ηb: viscosity after storage (mPa·s)

Evaluation criteria of storage stability evaluation:

A: The rate of change in viscosity before and after the storage was less than 5%.
B: The rate of change in viscosity before and after the storage was 5% or more and less than 10%.
C: The rate of change in viscosity before and after the storage was 10% or more.
*: Although fine precipitates were found after storage, there was no problem in practical use.

(b) Evaluation of Ease of Removing Traces of Applied Pretreatment Agent

An evaluation sample was obtained in the following manner. That is, first, water was applied to the image-formed surface of the T-shirt after the heat fixing step by using a spray. The amount of water applied was 0.02 g/cm². After application of the water, the T-shirt was dried using an oven set at 160° C. The heating time in the drying was 3.5 minutes. The L* values of the pretreatment agent-applied area and the pretreatment agent non-applied area of each of the thus obtained evaluation samples were measured using a CIE1976L*a*b* color space scale colorimeter X-Rite939 manufactured by X-Rite Corporation, and ΔL* was calculated by the following equation. On the basis of the calculated ΔL*, the ease of removing traces of the applied pretreatment agent was evaluated according to the following evaluation criteria. It is to be noted that the smaller the ΔL* is, the more the pretreatment agent is removed by the application of the water as a substitute for washing, the less conspicuous the traces of the applied pretreatment agent is, and it can be judged that the appearance is good.

$$\Delta L^* = L^*1 - L^*2$$

L*1: L* value of pretreatment agent-applied area
L*2: L* value of pretreatment agent non-applied area Evaluation criteria of evaluation of ease of removing traces of applied pretreatment agent:

A: ΔL* is less than 1
B: ΔL* is 1 or more and less than 1.5
C: ΔL* is 1.5 or more (c) Evaluation of washing fastness of image-formed area Each T-shirt was washed according to the U.S. Standard AATCC II A Method, and the washing fastness of the image-formed area was evaluated according to the following criteria.

Evaluation criteria of evaluation of washing fastness of image-formed area:

G: The laundry grade was grade 3, 3-4, 4, 4-5 or 5.
NG: The laundry grade was grade 1, 1-2, 2, or 2-3.

Table 1 summarizes the composition and evaluation results of the pretreatment agents of Example 1-1 and Comparative Examples 1-1 to 1-3.

TABLE 1

| | | | Ex. | Comp. Ex. | | |
|---|---|---|---|---|---|---|
| | | | 1-1 | 1-1 | 1-2 | 1-3 |
| Composition (wt %) | Metal salt | Calcium nitrate tetrahydrate | 15 | 15 | 15 | 15 |
| | | Calcium chloride | 3 | 3 | 3 | 3 |
| | Water-based polymer | PITZCOL ® K-60L (*1) | 1.5 | 1.5 | — | — |
| | | COGUM ® HW-62 (*2) | — | — | 1.5 | 1.5 |
| | Moisturizer | Glycerin | 40 | 40 | 40 | 40 |
| | Crosslinking agent | EPOCROS ® WS-700 (*3) | 1 | — | 1 | — |
| | Preservative or mildewproofing agent | Proxel GXL(S) (*4) | 0.1 | 0.1 | 0.1 | 0.1 |
| | | Water | Balance | Balance | Balance | Balance |
| Evaluation | | Storage stability | A | A | C | A |
| | | Ease of removing traces of applied pretreatment agent | A | A | C | A |
| | | Washing fastness of image-formed area | G | NG | G | NG |

Footnote of Table 1

(*1): Polyvinylpyrrolidone (water-soluble polymer containing no carboxyl group), manufactured by DKS Co., Ltd.

(*2): Acrylic acid ester copolymer resin (water-soluble polymer containing a carboxyl group); manufactured by SHOWA DENKO K.K.

(*3): Oxazoline group-containing compound, manufactured by Nippon Shokubai Co., Ltd.

(*4): 1,2-benzoisothiazole-3(2H)-one, manufactured by Arch Chemical, Inc.

Each numerical value in Table 1 represents the amount of active ingredient.

Each numerical value in Table 1 represents the amount of active ingredient.

As summarized in Table 1, Example 1-1 showed good results in all of the storage stability evaluation, the evaluation of ease of removing traces of applied pretreatment agent, and the evaluation of washing fastness of image-formed area. In contract, Comparative Examples 1-1 and 1-3 using no crosslinking agent that is crosslinkable with a carboxyl group in a component contained in the ink showed bad results in the evaluation of washing fastness of image-formed area. Moreover, Comparative Example 1-2 using a water-soluble polymer containing a carboxyl group showed bad results in the storage stability evaluation and the evaluation of ease of removing traces of applied pretreatment agent.

Example 2-1

A pretreatment agent of Example 2-1 was subjected to (a) a storage stability evaluation, (b) an evaluation of ease of removing traces of applied pretreatment agent, and (c) an evaluation of washing fastness of an image formed area in the same manner as in Example 1-1 except that a vinyl acetate emulsion resin that is a water-insoluble polymer was used as a water-based polymer as a substitute for polyvinylpyrrolidone that is a water-soluble polymer containing no carboxyl group.

Table 2 summarizes the composition and evaluation results of the predetermined agents of Examples 1-1 and 2-1.

TABLE 2

|  |  |  | Ex. | |
| --- | --- | --- | --- | --- |
|  |  |  | 1-1 | 2-1 |
| Composition (wt %) | Metal salt | Calcium nitrate tetrahydrate | 15 | 15 |
|  |  | Calcium chloride | 3 | 3 |
|  | Water-based polymer | PITZCOL ® K-60L (*1) | 1.5 | — |
|  |  | VINYBLAN ® GV-6181 (*5) | — | 1.5 |
|  | Moisturizer | Glycerin | 40 | 40 |
|  | Crosslinking agent | EPOCROS ® WS-700 (*3) | 1 | 1 |
|  | Preservative or mildewproofing agent | Proxel GXL(S) (*4) | 0.1 | 0.1 |
|  | Water |  | Balance | Balance |
| Evaluation | Storage stability |  | A | A |
|  | Ease of removing traces of applied pretreatment agent |  | A | B |
|  | Washing fastness of image-formed area |  | G | G |

Footnote of Table 2
(*1): Polyvinylpyrrolidone (water-soluble polymer containing no carboxyl group), manufactured by DKS Co., Ltd.
(*5): Vinyl acetate emulsion resin (non-water-based polymer), manufactured by Nissin Chemical Industry Co., Ltd.
(*3): Oxazoline group-containing compound, manufactured by Nippon Shokubai Co., Ltd.
(*4): 1,2-benzoisothiazole-3(2H)-one, manufactured by Arch Chemical, Inc.
Each numerical value in Table 2 represents the amount of active ingredient.

Each numerical value in Table 2 represents the amount of active ingredient.

As summarized in Table 2, comparing the evaluation results in Examples 1-1 and 2-1, Example 1-1 using a water-soluble polymer as a water-based polymer showed better results in the evaluation of ease of removing traces of applied pretreatment agent than Example 2-1 using a water-insoluble polymer.

Examples 3-1 and 3-2

A pretreatment agent of Example 3-1 was obtained in the same manner as in Example 1-1 except that the content of an oxazoline group-containing compound as a crosslinking agent before dilution with water was 0.15 wt %. A pretreatment agent of Example 3-2 was obtained in the same manner as in Example 3-1 except that a compound containing no oxazoline group was used as a crosslinking agent as a substitute for the oxazoline group-containing compound. The pretreatment agents of Examples 3-1 and 3-2 were subjected to a storage stability evaluation, an evaluation of ease of removing traces of applied pretreatment agent, and an evaluation of washing fastness of image-formed area, and the evaluation results were compared with those in Comparative Example 1-1.

Table 3 summarizes the composition and evaluation results of the pretreatment agents of Examples 3-1 and 3-2 and Comparative Example 1-1.

TABLE 3

|  |  |  | Ex. | | Comp. Ex. |
| --- | --- | --- | --- | --- | --- |
|  |  |  | 3-1 | 3-2 | 1-1 |
| Composition (wt %) | Metal salt | Calcium nitrate tetrahydrate | 15 | 15 | 15 |
|  |  | Calcium chloride | 3 | 3 | 3 |
|  | Water-based polymer | PITZCOL ® K-60L (*1) | 1.5 | 1.5 | 1.5 |
|  | Moisturizer | Glycerin | 40 | 40 | 40 |
|  | Crosslinking agent | EPOCROS ® WS-700 (*3) | 0.15 | — | — |
|  |  | CARBODILITE ® V-02 (*6) | — | 0.15 | — |
|  | Preservative or mildew-proofing agent | Proxel GXL(S) (*4) | 0.1 | 0.1 | 0.1 |
|  | Water |  | Balance | Balance | Balance |
| Evaluation | Storage stability |  | A | A* | A |
|  | Ease of removing traces of applied pretreatment agent |  | A | A | A |
|  | Washing fastness of image-formed-area |  | G | G | NG |

Footnote of Table 3
(*1): Polyvinylpyrrolidone (water-soluble polymer containing no carboxyl group), manufactured by DKS Co., Ltd.
(*3): Oxazoline group-containing compound, manufactured by Nippon Shokubai Co., Ltd.
(*6): Water-based crosslinking agent (containing no oxazoline group) obtained by applying a hydrophilic segment to a polycarbodiimide resin, manufactured by Nisshinbo Chemical Inc.
(*4): 1,2-benzoisothiazole-3(2H)-one, manufactured by Arch Chemical, Inc.
Each numerical value in Table 3 represents the amount of active ingredient.

Each numerical value in Table 3 represents the amount of active ingredient.

As summarized in Table 3, Examples 3-1 and 3-2 showed good results in all of the storage stability evaluation, the evaluation of ease of removing traces of applied pretreatment agent, and the evaluation of washing fastness of image-formed area. Comparing the evaluation results in Examples 3-1 and 3-2, Example 3-1 using an oxazoline group-containing compound as a crosslinking agent showed a better result in the storage stability evaluation than Example 3-2 using a water-based crosslinking agent obtained by applying a hydrophilic segment to a polycarbodiimide resin. In contract, as mentioned above, Comparative Example 1-1 using no crosslinking agent that is crosslinkable with a carboxyl group in a component contained in the ink showed a bad result in the evaluation of washing fastness of image-formed area.

Examples 4-1 to 4-7

Pretreatment agents of Examples 4-1 to 4-7 obtained in the same manner as in Examples 1-1 and 3-1 and Comparative Example 1-1 except that the content of the oxazoline group-containing compound as a crosslinking agent was changed were subjected to a storage stability evaluation, an evaluation of ease of removing traces of applied pretreatment agent, and an evaluation of washing fastness of image-formed area, and the evaluation results were compared with those in Examples 1-1 and 3-1 and Comparative Example 1-1. In addition, the pretreatment agents of Example 1-1, 3-1, and 4-4 to 4-7 and Comparative Example 1-1 were further subjected to (d) a storage (discoloration) evaluation.

(d) Storage Stability (Discoloration) Evaluation

Each pretreatment agent (not diluted with water) was placed in a glass container and stored in an environment at 70° C. for 72 hours. Using, as evaluation samples, the pretreatment agents before and after storage, diluted with water to each have a weight of 3 times, and $L^*$, $a^*$, and $b^*$ values were measured using a spectrocolorimeter CM-3700d manufactured by Minolta, and the color difference $\Delta E^*ab$ was calculated by the following equation and evaluated according to the following evaluation criteria.

$$\Delta E^*ab = \{(L_1^* - L_2^*)^2 + (a_1^* - a_2^*)^2 + (b_1^* - b_2^*)^2\}^{1/2}$$

$L_1^*$: $L^*$ value of evaluation sample before storage
$L_2^*$: $L^*$ value of evaluation sample after storage
$a_1^*$: $a^*$ value of evaluation sample before storage
$a_2^*$: $a^*$ value of evaluation sample after storage
$b_1^*$: $b^*$ value of evaluation sample before storage
$b_2^*$: $b^*$ value of evaluation sample after storage Evaluation criteria of storage stability (discoloration) evaluation:
A: $\Delta E^*ab$ is less than 1
B: $\Delta E^*ab$ is 1 or more and less than 3
C: $\Delta E^*ab$ is 3 or more Table 4 shows the composition and evaluation results of the pretreatment agents of Examples 1-1, 3-1, and 4-1 to 4-7 and Comparative Example 1-1.

TABLE 4

|  |  |  | Ex. | | | | | | | | | Comp. Ex. |
|---|---|---|---|---|---|---|---|---|---|---|---|---|
|  |  |  | 1-1 | 3-1 | 4-1 | 4-2 | 4-3 | 4-4 | 4-5 | 4-6 | 4-7 | 1-1 |
| Composition (wt %) | Metal salt | Calcium nitrate tetrahydrate | 15 | 15 | 15 | 15 | 15 | 15 | 15 | 15 | 15 | 15 |
|  |  | Calcium chloride | 3 | 3 | 3 | 3 | 3 | 3 | 3 | 3 | 3 | 3 |
|  | Water-based polymer | PITZCOL ® K-60L (*1) | 1.5 | 1.5 | 1.5 | 1.5 | 1.5 | 1.5 | 1.5 | 1.5 | 1.5 | 1.5 |
|  | Moisturizer | Glycerin | 40 | 40 | 40 | 40 | 40 | 40 | 40 | 40 | 40 | 40 |
|  | Crosslinking agent | EPOCROS ® WS-700 (*3) | 1 | 0.15 | 0.001 | 0.05 | 0.1 | 1.5 | 1.8 | 2.1 | 2.5 | — |
|  | Preservative or mildew-proofing agent | Proxel GXL(S) (*4) | 0.1 | 0.1 | 0.1 | 0.1 | 0.1 | 0.1 | 0.1 | 0.1 | 0.1 | 0.1 |
|  |  | Water | Balance | Balance | Balance | Balance | Balance | Balance | Balance | Balance | Balance | Balance |
|  | Content of crosslinking agent relative to 100 parts by weight of water-based polymer (parts by weight) |  | 67 | 10 | 1 | 3 | 7 | 100 | 120 | 140 | 170 | 0 |
| Evaluation | Storage stability |  | A | A | A | A | A | A | A | A | A | A |
|  | Storage stability (discoloration) |  | A | A | (A) | (A) | (A) | A | B | B | B | A |
|  | Ease of removing traces of applied pretreatment agent |  | A | A | A | A | A | A | B | B | B | A |
|  | Washing fastness of image-formed area |  | G | G | G | G | G | G | G | G | G | NG |

Footnote of Table 4

(*1): Polyvinylpyrrolidone (water-soluble polymer containing no carboxyl group), manufactured by DKS Co., Ltd.

(*3): Oxazoline group-containing compound, manufactured by Nippon Shokubai Co., Ltd.

(*4): 1,2-benzoisothiazole-3(2H)-one, manufactured by Arch Chemical, Inc.

Each numerical value in Table 4 represents the amount of active ingredient.

Each numerical value in Table 4 represents the amount of active ingredient.

As summarized in Table 4, Examples 1-1, 3-1, and 4-1 to 4-7 setting the content of the crosslinking agent to 1 part by weight or more relative to 100 parts by weight of the water-based polymer showed good results in the evaluation of washing fastness of image formed area. Moreover, Examples 1-1, 3-1, and 4-1 to 4-4 setting the content of the crosslinking agent to 100 parts by weight or less relative to 100 parts by weight of the water-based polymer showed better results in the storage stability (discoloration) evaluation and the evaluation of the ease of removing traces of applied pretreatment agent than Examples 4-5 to 4-7 setting the content of the crosslinking agent to more than 100 parts by weight. The storage stability (discoloration) evaluation was not performed in Examples 4-1 to 4-3. However, since the discoloration depends on the content of the crosslinking agent, the results of the storage stability (discoloration) evaluation of Examples 4-1 to 4-3 were considered to be "A".

Reference Examples 5-1 to 5-5

Pretreatment agents of Reference Examples 5-1 to 5-5 obtained in the same manner as in Example 1-1 except that the content of the water-based polymer was changed, and a moisturizer and a crosslinking agent were not used were subjected to a storage stability evaluation, an evaluation of ease of removing traces of applied pretreatment agent, and an evaluation of washing fastness of image-formed area.

Table 5 summarizes the composition and evaluation results of the predetermined agents of Example 1-1 and Reference Examples 5-1 to 5-5.

TABLE 5

| | | | Ex. | Ref. Ex. | | | | |
|---|---|---|---|---|---|---|---|---|
| | | | 1-1 | 5-1 | 5-2 | 5-3 | 5-4 | 5-5 |
| Composition (wt %) | Metal salt | Calcium nitrate tetrahydrate | 15 | 15 | 15 | 15 | 15 | 15 |
| | | Calcium chloride | 3 | 3 | 3 | 3 | 3 | 3 |
| | Water-based polymer | PITZCOL ® K-60L (*1) | 1.5 | 0.3 | 0.6 | 0.9 | 1.2 | 6 |
| | Moisturizer | Glycerin | 40 | — | — | — | — | — |
| | Crosslinking agent | EPOCROS ® WS-700 (*3) | 1 | — | — | — | — | — |
| | Preservative or mildewproofing agent | Proxel GXL(S) (*4) | 0.1 | 0.1 | 0.1 | 0.1 | 0.1 | 0.1 |
| | | Water | Balance | Balance | Balance | Balance | Balance | Balance |
| Evaluation | | Storage stability | A | A | A | A | A | A |
| | | Ease of removing traces of applied pretreatment agent | A | A | A | A | A | B |
| | | Washing fastness of image-formed area | G | NG | NG | NG | NG | NG |

Footnote of Table 5
(*1): Polyvinylpyrrolidone (water-soluble polymer containing no carboxyl group), manufactured by DKS Co., Ltd.
(*3): Oxazoline group-containing compound, manufactured by Nippon Shokubai Co., Ltd.
(*4): 1,2-benzoisothiazole-3(2H)-one, manufactured by Arch Chemical, Inc.
Each numerical value in Table 5 represents the amount of active ingredient.

Each numerical value in Table 5 represents the amount of active ingredient.

As summarized in Table 5, Reference Examples 5-1 to 5-5 use no crosslinking agent and thus showed bad results in the evaluation of washing fastness of image-formed area but showed the same results in the storage stability evaluation and the evaluation of ease of removing traces of applied pretreatment agent as Example 1-1 even though the content of the water-based polymer was changed.

It will be obvious to those having skill in the art that many changes may be made in the above-described details of the particular aspects described herein without departing from the spirit or scope of the invention as defined in the appended claims.

What is claimed is:

1. A pretreatment agent to be applied to fabric before application of an ink in formation of an image on the fabric, comprising:
a water-based polymer virtually containing no carboxyl group, wherein said water-based polymer is selected from polyvinylpyrrolidone, polyvinyl alcohol, polyacrylamide, hydroxyethyl cellulose, starch, dextrin, and resins obtained by emulsifying compounds composed of monomers selected from styrene, acrylamide, ethylene, and vinyl acetate; and a crosslinking agent that is crosslinkable with a carboxyl group in a component contained in the ink.

2. The pretreatment agent according to claim 1, wherein the water-based polymer is a water-soluble polymer.

3. The pretreatment agent according to claim 1, wherein the crosslinking agent is an oxazoline group-containing compound.

4. The pretreatment agent according to claim 1, wherein a content of the crosslinking agent is 1 part by weight relative to 100 parts by weight of the water-based polymer.

5. The pretreatment agent according to claim 1, wherein a content of the crosslinking agent is less than 100 parts by weight relative to 100 parts by weight of the water-based polymer.

6. The pretreatment agent according to claim 1, wherein the water-based polymer is a polyvinylpyrrolidone.

7. The pretreatment agent according to claim 1, wherein a content of the water-based polymer in the total amount of the pretreatment agent is 0.1 wt % to 0.5 wt % in actual use.

8. A pretreatment agent applicator for applying a pretreatment agent to fabric before application of an ink in formation of an image on the fabric, comprising:
 a platen and
 a pretreatment agent application unit configured to apply the pretreatment agent to the fabric, wherein
 the pretreatment agent comprises:
 a water-based polymer virtually containing no carboxyl group, wherein said water-based polymer is selected from polyvinylpyrrolidone, polyvinyl alcohol, polyacrylamide, hydroxyethyl cellulose, starch, dextrin, and resins obtained by emulsifying compounds composed of monomers selected from styrene, acrylamide, ethylene, and vinyl acetate; and
 a crosslinking agent that is crosslinkable with a carboxyl group in a component contained in the ink.

9. A method for forming an image on fabric, comprising the steps of:
 applying a pretreatment agent to fabric; and
 printing an image on a pretreatment agent-applied area using an ink, wherein
 in the pretreatment step, the pretreatment agent according to claim 1 is used as the pretreatment agent.

\* \* \* \* \*